United States Patent [19]
Hasegawa et al.

[11] Patent Number: 6,127,438
[45] Date of Patent: Oct. 3, 2000

[54] POLYETHYLENE MICROPOROUS FILM AND PROCESS FOR PRODUCING THE SAME

[75] Inventors: Takuya Hasegawa; Takahiko Kondo, both of Yokohama, Japan

[73] Assignee: Asahi Kasei Kogyo Kabushiki Kaisha, Osaka, Japan

[21] Appl. No.: 08/894,714

[22] PCT Filed: Mar. 1, 1996

[86] PCT No.: PCT/JP96/00500

§ 371 Date: Aug. 26, 1997

§ 102(e) Date: Aug. 26, 1997

[87] PCT Pub. No.: WO96/27633

PCT Pub. Date: Sep. 12, 1996

[30] Foreign Application Priority Data

Mar. 3, 1995 [JP] Japan .................................. 7-044053

[51] Int. Cl.⁷ ...................................... C08J 9/14
[52] U.S. Cl. ................. 521/64; 210/500.27; 210/500.36; 210/500.42; 264/41; 264/210.3; 264/210.4; 264/210.5; 264/210.7; 264/211; 264/211.13; 264/211.2; 428/315.5; 429/249; 429/254; 521/143
[58] Field of Search ..................... 429/249, 254; 521/64, 143; 264/41, 210.3, 210.4, 210.5, 210.7, 211, 211.13, 211.2; 210/500.27, 500.36, 500.42; 428/315.5

[56] References Cited

U.S. PATENT DOCUMENTS

| | | | |
|---|---|---|---|
| 4,257,997 | 3/1981 | Soehngen et al. | 264/145 |
| 4,873,034 | 10/1989 | Kono et al. | |
| 5,015,521 | 5/1991 | Fujii et al. | 521/143 |
| 5,134,174 | 7/1992 | Xu et al. | 521/143 |
| 5,288,762 | 2/1994 | Park et al. | 521/79 |
| 5,318,866 | 6/1994 | Degen et al. | 429/254 |
| 5,447,636 | 9/1995 | Banerjee . | |
| 5,674,919 | 10/1997 | Yagi et al. | 521/143 |
| 5,759,678 | 6/1998 | Fujii et al. | 521/143 |
| 5,882,518 | 3/1999 | Yagi et al. | 210/500.36 |

FOREIGN PATENT DOCUMENTS

| | | |
|---|---|---|
| 0547237A1 | 6/1993 | European Pat. Off. . |
| 56-73857 | 6/1981 | Japan . |
| 62-132943 | 6/1987 | Japan . |
| 63-205048 | 8/1988 | Japan . |
| 1167344 | 7/1989 | Japan . |
| 3-59947 | 3/1991 | Japan . |
| 3-105851 | 5/1991 | Japan . |
| 3-245457 | 11/1991 | Japan . |
| 3-274661 | 12/1991 | Japan . |
| 4-206257 | 7/1992 | Japan . |
| 6-329823 | 11/1994 | Japan . |

*Primary Examiner*—John M. Cooney, Jr.
*Attorney, Agent, or Firm*—Birch, Stewart, Kolasch & Birch LLP

[57] ABSTRACT

A polyethylene microporous film excellent in mechanical strength, permeability and productivity and having a very high reliability such that the safety of a battery may be secured even under severe circumstances which film has a crosslinked structure and has a porosity of 20–80%, a gel fraction of 1% or more, and an average pore diameter determined by the permeation method of 0.001–0.1 μm, and a process for producing the polyethylene microporous film.

17 Claims, No Drawings

POLYETHYLENE MICROPOROUS FILM AND PROCESS FOR PRODUCING THE SAME

TECHNICAL FIELD

The present invention relates to a polyethylene microporous film suitable as a separator for batteries and a process for producing the same.

BACKGROUND ART

Polyethylene microporous film is in use for precision filtration film, separators for batteries, separators for condensers and the like. Among these uses, when the film is used as a separator for batteries, particularly as a separator for lithium ion batteries, the film is required to have, in addition to such general characteristics of microporous films as good mechanical strength and permeability, the so-called fuse effect which signifies that when the inside of the battery is overheated the separator is molten to form a film which covers the electrode and breaks the electric current and thereby secures the safety of the battery.

It is known that in the case of polyethylene microporous film the temperature at which the fuse effect manifests itself, that is, the fuse temperature, is in the range of about 130–150° C. Even when the inside of the battery is overheated for some reason, the microporous film melts at the point of time at which the inside temperature reaches the fuse temperature to cover the electrode as a continuous film, whereby the electric current is broken and the battery reaction is stopped. However, when the temperature rise is very rapid the battery temperature may continue to rise even after the fuse effect has been developed with the result that sometimes the continuous film is broken to cause the return of electric current (that is, to cause a short-circuit); this presents a serious problem in respect of safety. Accordingly, the development of a polyethylene microporous film having a high heat resistance which makes it possible to secure the safety of the battery even under such severe conditions has been eagerly desired.

For example, JP-A-4-206257 discloses a method which improves the heat resistance of polyethylene by blending therewith polypropylene, which has a higher melting point than polyethylene. In this method, however, though a certain extent of improvement in heat resistance can be expected in the microporous film, the film readily flows and breaks after becoming molten by overheating even though it contains blended polypropylene, so that a substantial improvement is not attained in respect of securing the safety of the battery. Moreover, this method has a difficulty in that polypropylene is poorly compatible with polyethylene and hence the polymers tend to separate from each other in the microporous film, thereby lowering the film strength.

JP-A-3-105851 discloses a method of improving the mechanical strength of high molecular weight polyethylene by blending therewith a specific amount of superhigh molecular weight polyethylene. Since superhigh molecular weight polyethylene has a considerably high viscosity even after melting, that is, has a good shape-retaining property, the polyethylene microporous film obtained by the disclosed method does not readily break even after being molten, but nevertherless the film does break under severe conditions. Thus, this method does not bring a substantial solution of the problem, like the aforesaid patent disclosure.

JP-A-56-73857, JP-A-63-205048, JP-A-3-274661, JP-A-1-167344 and JP-A-6-329823 disclose methods of improving the mechanical strength, oxidation resistance and heat resistance of polyolefin microporous film by crosslinking the film.

Among them, the invention disclosed by JP-A-56-73857 is directed to a microporous film for lead batteries which contains inert fillers. However, the microporous film has a low mechanical strength of 120 kg/cm$^2$ and hence is unacceptable for use as separators.

The polyethylene microporous film disclosed in JP-A-63-205048 is a film of a large pore diameter with a maximum pore diameter of 20 μm and can hardly exhibit the fuse effect and moreover involves the risk of short-circuits caused by precipitated metals and crumbled active materials. Thus, it is unsuitable as a separator.

JP-A-1-167344 discloses a method which comprises adding a crosslinking agent, but the polyolefin microporous film obtained by the method shows a low breaking strength of 330 kg/cm$^2$ or less and hence is unsuitable for use as separators.

JP-A-3-274661 discloses a method which comprises applying the irradiation of ionizing radiation at a relatively small dose of 0.1–10 Mrad to a special microporous film containing the same inert fillers as used in JP-A-56-73856 and to a microporous film produced by the stretching hole-opening method. However, the microporous films thus obtained involve a risk in that, as shown in FIGS. 3 and 4 of JP-A-3-274661, when these polyolefin microporous films are thoroughly crosslinked, the increase of impedance at the time when the fuse effect is to be developed becomes slow, resulting in the delay of electric current breakage. Moreover, according to circumstances, the separator which is in an incomplete state of fusing may conversely become a resistance component and cause the build-up of heat in the battery. Furthermore, these microporous films are unsatisfactory in mechanical strength in view of the needs of the market and also present difficulties in improving the productivity of batteries.

JP-A-6-329823 discloses a method for producing a microporous film which comprises crosslinking a polyolefin sheet, then immersing the sheet in a good solvent for polyolefin to swell the sheet, and preventing the shrinkage of the sheet or stretching the sheet. This method has been devised for the purpose of omitting the step of producing a polyethylene hot solution which has been indispensable in the production of previous polyethylene microporous film, but the disclosure teaches nothing about the heat resistance of the film obtained. Moreover, the method has problems in that since the sheet is prepared without going through a hot solution, stretching at a high draw ratio is difficult to achieve and hence it is difficult to obtain a sheet having a high strength. Moreover, a lot of time is required for sweeling the sheet and hence the method is not practical as an industrial process.

DISCLOSURE OF THE INVENTION

The object of the present invention is to provide, overcoming the above-mentioned problems, a polyethylene microporous film which is excellent in mechanical property, permeability and productivity and has both a sharp fuse effect and a high heat resistance which can assure the safety of batteries even under severe situations.

The inventors have made extensive studies to obtain such a polyethylene microporous film. As the result, it has been found that a polyethylene microporous film which has both a sharp fuse effect and a high heat resistance can be obtained by applying a crosslinking treatment to a specific polyethylene microporous film or the intermediate product thereof. The present invention has been accomplished on the basis of the above finding.

Thus, the first aspect of the present invention is directed to a polyethylene microporous film having a high strength and excellent heat resistance which has a crosslinked structure and has a porosity of 20–80%, a gel fraction of 1% or more and an average pore diameter as determined by the permeation method of 0.001–0.1 µm. The aspect relates preferably to a polyethylene microporous film having a residual contraction rate of 15% or more, more preferably to a polyethylene microporous film having a fuse speed of 5.0 or more, still more preferably to a polyethylene microporous film having a piercing strength of 300 g or more, still further more preferably to a polyethylene microporous film having a piercing strength of 400 g or more, and most preferably to a polyethylene microporous film having a breaking time of 20 seconds or more as determined in silicone oil at 160° C.

The second aspect of the present invention is directed to a polyethylene microporous film produced by a process for producing microporous film comprising the steps of preparing a hot solution consisting essentially of polyethylene and a plasticizer, cooling and solidifying the hot solution to form a sheet, stretching the sheet in at least a uniaxial direction to obtain an oriented film, and removing by extraction the plasticizer contained in the oriented film, wherein at least one time of crosslinking treatment is applied to the sheet or film in any one of the process steps or after the steps. The aspect relates more preferably to a polyethylene microporous film obtained by applying the crosslinking treatment after stretching.

The third aspect of the present invention is directed to a process for producing a polyethylene microporous film comprising the steps of preparing a hot solution consisting essentially of polyethylene and a plasticizer, cooling and solidifying the hot solution to form a sheet, stretching the sheet in at least a uniaxial direction to obtain an oriented film, and removing by extraction the plasticizer contained in the oriented film, wherein at least one time of a crosslinking treatment is applied to the sheet or film in any one of the process steps or after the steps. The aspect relates preferably to a process for producing a polyethylene microporous film wherein the crosslinking treatment is applied after stretching, more preferably to a process for producing a polyethylene microporous film wherein the method of crosslinking is electron beam irradiation, most preferably to a process for producing a polyethylene microporous film wherein the electron beam is irradiated after removing the plasticizer by extraction.

The fourth aspect of the present invention is directed to a separator for batteries which uses the polyethylene microporous film according to the aforesaid first to third aspects.

The fifth aspect of the present invention is directed to a battery which uses the separator for batteries according to the aforesaid fourth aspect.

BEST MODE FOR CARRYING OUT THE INVENTION

The present invention is described in detail below.

First, description is given of the polyethylene microporous film of the present invention.

After extensive study on the fuse speed of a separator, the present inventors have found that the fuse speed in a crosslinked microporous separator is subject to the influences of the pore diameter of the micropore, the molecular weight of the polymer used in forming the film, the gel fraction of the microporous film, and other factors, among which the influence of the pore diameter is most marked.

After further study on crosslinking a specific microporous film and the intermediate product thereof, the inventors have found that whereas previous microporous films undergo a marked decrease in the fuse speed by several Mrad of electron beam irradiation, the microporous film of the present invention, owing to its small pore diameter, is not materially influenced by the molecular weight of the starting material polymer and the gel fraction of the microporous film, and a microporous film which has both a high heat resistance and a sharp fuse effect can be produced. Thus, the present invention has been completed.

Gel fraction

The gel fraction, which specifies the crosslink structure of microporous film, may be evaluated by a method of determination according to ASTM D2765. The gel fraction in the present invention is at least 1%, preferably at least 5%, more preferably at least 10%. The upper limit of the gel fraction is not particularly restricted but, in the case of crosslinking by electron beam irradiation, for example, excessive irradiation is apt to cause the lowering of the strength of the microporous film, so that the crosslink structure is preferably controlled with a value of about 80% as a guidepost.

Residual contraction rate

The heat resistance of a separator is markedly improved by crosslinking but, in spite of the improvement in heat resistance, the contraction stress, which may cause a short-circuit, is preferably decreased to as low a level as possible.

For example, in the production process of the present invention, the timing of application of crosslinking may be roughly divided to application before stretching and that after stretching. Of the two, when crosslinking is applied after stretching, since the molecules elongated by the stretching have been fixed at the crosslinking points, the contraction of the microporous film at the time of fusing can be suppressed and consequently, as compared with a case wherein crosslinking is applied before stretching, the heat resistance of the microporous film can be improved at the same gel fraction.

When crosslinking is applied before stretching, on the other hand, the fused microporous film develops a large contraction stress owing to its tendency to recover the shape assumed at the time of crosslinking, so that, depending on the battery structure, the film has a higher tendency to undergo a short-circuit as compared with a microporous film crosslinked after stretching. This tendency is particularly apt to develop when the gel fraction has a high value of 30% or more.

As is apparent from the foregoing, the degree of difficulty for the microporous film to undergo contraction at the time of fusing can be evaluated by the residual contraction rate of the film. The residual contraction rate of the microporous film according to the present invention is at least 15%, preferably at least 20%, more preferably at least 30%.

Fuse characteristic

The fuse temperature of the polyethylene microporous film of the present invention can be obtained from the temperature dependency of impedance in the simplified cell determination. The fuse temperature of the polyethylene microporous film according to the present invention is 100° C.–160° C., preferably 110° C.–140° C., and more preferably 120° C.–135° C. When a film having a fuse temperature higher than 160° C. is used as a separator for batteries, there may arise the problems of the degradation of the electrolyte and the runaway reaction of the electrode. Considering that the use of the film at high temperatures, e.g., inside automobiles, is inevitable, a fuse temperature of the microporous film below 100° C. is undesirable.

The sharpness of fuse (that is, fuse speed) can be determined from the rate of increase of the logarithm of impedance with temperature at an impedance of 1000 Ω in the simplified cell determination. The fuse speed of the microporous film according to the present invention is preferably at least 5.0, more preferably at least 10.0. When the fuse speed is less than 5.0, the heat generation of the separator itself due to incomplete state of fusing cannot be neglected; this is undesirable.

In this connection, the fuse speed of the microporous film disclosed in the aforesaid JP-A-3-274661 is 10.0 for uncrosslinked film and 2.1 for crosslinked film.

Heat resistance evaluation

The heat resistance of the microporous film of the present invention as a separator may be ultimately evaluated by such various acceleration tests as the overcharge test, external short-circuit test and heating test which are conducted with a battery assembled by using the microporous film. However, the present inventors have made extensive studies on the film breaking behavior of the microporous film after fusing, and as a result have found that the results of evaluation by these acceleration tests are closely correlated to the film breaking time determined in silicone oil at 160° C.

Thus, the polyethylene microporous film according to the present invention, which shows a breaking time of at least 20 seconds in silicone oil at 160° C., passed all the acceleration tests described above. On the other hand, polyethylene microporous films according to the prior art could not pass at least one of the acceleration tests, and showed a breaking time of not more than 20 seconds. Thus, the breaking times were in good correspondence to the results of the acceleration tests.

The polyethylene microporous film according to the present invention has a sharp fuse effect and high heat resistance as described above and moreover, with regard to other general properties, has an air permeability, converted to a thickness of 25 μm, of not more than 2,000 seconds and a breaking strength of not less than 500 kg/cm$^2$; thus it is superior to previous polyethylene microporous films not only in heat resistance but also in mechanical strength and permeability.

The polyethylene used in the present invention is preferably a high density polyethylene or a copolymer of ethylene with an α-olefin, which are crystalline polymers comprising mainly ethylene units, and may contain not more than 30% of polyolefins, e.g., polypropylene, medium density polyethylene, linear low density polyethylene, low density polyethylene and EPR, blended therewith.

The weight average molecular weight of the polyethylene is $10^5$ to $4\times10^6$, preferably $2\times10^5$ to $10^6$, more preferably $2\times10^5$ to $7\times10^5$. When the molecular weight is less than $10^5$, the sheet is apt to break at the time of stretching, whereas when it is more than $4\times10^6$, the hot solution used for sheet production is prepared with difficulty and the fuse effect of the microporous film obtained is slow. The weight average molecular weight of the polymer to be used may be adjusted to a favorable range by such means as blending and multistage polymerization.

The film thickness of the microporous film is 1–500 μm, preferably 10–200 μm, more preferably 15–50 μm. When the film thickness is less than 1 μm, the mechanical strength of the film is insufficient, whereas when it is more than 500 μm difficulties arise in obtaining batteries of smaller size and lighter weight.

The porosity of the microporous film is 20–80%, preferably 30–60%. When the porosity is less than 20%, the permeability of the film is insufficient, whereas when it is more than 80%, the mechanical strength of the film is unsatisfactory.

The average pore diameter of the micropores can be determined by the permeation method using a water-soluble polymer, such as pullulan. The average pore diameter of micropores of the microporous film according to the present invention is 0.001–0.1 μm, preferably 0.005–0.05 μm, more preferably 0.01–0.03 μm. When the average pore diameter is less than 0.001 μm the permeability is insufficient, whereas when it is more than 0.1 μm the fuse effect is exhibited undesirably slow.

The piercing strength of the microporous film is at least 300 g, preferably at least 400 g, more preferably at least 450 g. When the piercing strength is less than 300 g, there is a likelihood of the separator being short-circuited by active materials and the like which have fallen off.

The process for producing the polyethylene microporous film of the present invention is described below.

The process for producing the polyethylene microporous film of the present invention comprises as the basis the three steps of film forming step, stretching step and extracting step, wherein at least one time of crosslinking treatment is applied in any one of these steps or after these steps.

Film forming step

The polymer gel which is an intermediate product of the present invention is prepared by dissolving polyethylene in a plasticizer at a temperature not lower than its melting point to form a hot solution and then cooling the solution to a temperature not higher than the crystallization temperature.

The plasticizer referred to herein means an organic compound which can form a uniform solution with polyethylene at a temperature not higher than its boiling point and may be, for example, decalin, xylene, dioctyl phthalate, dibutyl phthalate, stearyl alcohol, oleyl alcohol, decyl alcohol, nonyl alcohol, diphenyl ether, n-decane, n-dodecane and paraffin oil. Preferred among them are paraffin oil and dioctyl phthalate. The proportion of the plasticizer in the polymer gel is not particularly limited but is preferably 20% to 90%, more preferably 50% to 70%. When the proportion is not more than 20%, a microporous film having a suitable porosity is difficult to obtain, whereas when it is not less than 90% the viscosity of the hot solution decreases to make the continuous sheet formation difficult.

The method used for forming the film is not particularly limited. For example, a sheet several ten lm to several mm in thickness can be formed continuously by feeding a high density polyethylene powder and a plasticizer into an extruder, melt-kneading them at a temperature of about 200° C. and then casting the kneaded mixture through a conventional hanger coat die on a cooling roll.

In the present invention, since superhigh molecular weight polyethylene is not an indispensable component, a special heating-dissolving apparatus is unnecessary and a uniform sheet can be prepared in a very simple manner merely by feeding polyethylene and a plasticizer into an extruder.

Stretching step

The sheet obtained above is then stretched in at least a uniaxial direction to obtain an oriented film. The method of stretching is not particularly limited and may be the tenter method, roll method and rolling method. Particularly preferred of these is a simultaneous biaxial stretching using the tenter method. The stretching temperature is from ordinary temperature to the melting point of the polymer gel, preferably 80–130° C., more preferably 100–125° C. The draw ratio, in terms of area ratio, is 4–400-fold, preferably 8–200- fold, more preferably 16–100-fold. when the draw ratio is not more than 4-fold, the film strength is insufficient as a separator; when it is not less than 400-fold, the stretching operation is difficult and moreover the porosity of the microporous film obtained is apt to be undesirably low.

Extraction step

Then the plasticizer is removed by extraction from the oriented film to obtain a microporous film. The method used for extraction is not particularly limited. For example, when paraffin oil or dioctyl phthalate is used, they can be removed by extracting them with an organic solvent, such as methylene chloride and MEK, and then heat-drying the microporous film at a temperature not higher than its fuse temperature. When a low boiling point compound, such as decalin, is used as a plasticizer, it can be removed merely by heat-drying the microporous film at a temperature not higher than its fuse temperature. In either case, the film is desirably constrained so as to prevent the deterioration of properties due to contraction of the film.

Crosslinking

In the first production process, the crosslinking treatment is applied after the film forming step.

The methods used for crosslinking include irradiation with ultraviolet light, electron beams, or ionizing radiations represented by γ-rays, and further chemical crosslinking using crosslinking agents and crosslinking auxiliaries. Preferred of these is the method of electron beam irradiation.

The dose in the crosslinking by electron beam irradiation is 5 Mrad–200 Mrad, preferably 10 Mrad–100 Mrad, more preferably 15 Mrad–50 Mrad. When the dose is too small the resulting microporous film is insufficiently improved in heat resistance; when the dose is too large the development of the fuse effect of the microporous film is slow and the mechanical strength of the film decreases. To prevent the lowering of mechanical strength the irradiation is preferably conducted under conditions of oxygen concentration in the system reduced to as low a level as possible, for example, by introducing nitrogen gas into the system during the irradiation operation.

The depth of the crosslinked layer formed by electron beam irradiation depends on the acceleration voltage. Since the thickness of the sheet can be made larger than the thickness of the crosslinked layer, the first production process makes it possible to prepare a sheet crosslinked only in its surface layer. By using a sheet crosslinked in the above-mentioned manner, a polyethylene microporous film of multi-layer structure can be obtained. In such a case, even when a large dose of irradiation is applied, the lowering of mechanical strength and the decrease of speed of fuse effect can be prevented by virtue of the presence of an uncrosslinked layer inside the film. In this case it is preferable to increase the minimum dose according to the depth of the crosslinked layer such that the gel fraction of the film as a whole may reach a favorable range.

When a crosslinking agent or crosslinking auxiliary is added in the film forming step, the crosslinking efficiency is improved and thus a sufficient heat resistance can be imparted to the microporous film even with a smaller dose of irradiation.

In order to prevent the microporous film from contracting at the time of exhibiting the fuse effect, the crosslinking treatment may be applied later again, for example, by irradiating the microporous film again with electron beams after extraction of the plasticizer.

In the second production process, the crosslinking treatment is applied after the stretching step.

The method used for crosslinking may be similar to those used in the first process but, since the stretched film is relatively thin, in the electron beam irradiation a comparable heat resistance can be imparted with a smaller dose of irradiation than in the first process.

The dose in the electron beam irradiation is 1 Mrad–200 Mrad, preferably 2 Mrad–100 Mrad, more preferably 5 Mrad–50 Mrad. When the dose is too small the improvement of the heat resistance of the product obtained is insufficient; when the dose is too large the resulting product is slow in developing the fuse effect and also has a decreased mechanical strength.

When a large dose of irradiation is applied at one time, the polyethylene is heated by the energy of the electron beams and as a result troubles, e.g., melting of the film, are apt to occur. Therefore, when the dose is 10 Mrad or more, the irradiation is preferably divided into several times of application.

In order to prevent the microporous film from contracting at the time of fusing, the crosslinking treatment may be applied later again, for example, by irradiating the microporous film again with electron beams after extraction of the plasticizer.

In the third production process, the crosslinking treatment is applied after the extraction step.

The method for crosslinking may be the same as those used in the second process. However, the film from which the plasticizer has been extracted has a large specific surface area and is susceptible particularly to the influence of oxygen, so that, in conducting electron beam irradiation, the oxygen concentration in the irradiation apparatus is preferably reduced to as low a level as possible, for example, by blowing an inert gas, such as nitrogen, into the apparatus. Further, if necessary and desired, it is possible to effect surface modification of the film simultaneously with crosslinking by introducing various gases into the porous part of the film.

Besides the three processes described above, the crosslinking treatment can also be applied within the film forming step, stretching step or extraction step. When a chemical crosslinking agent is used, for example, the crosslinking treatment may be applied during the preparation of the hot solution by adding the crosslinking agent to the starting materials in a predetermined concentration and raising the temperature in the extruder above the reaction temperature of the chemical crosslinking agent. Further, when the electron beam irradiation is applied to the hot solution before being cooled and solidified in the film forming step, to the sheet which is being stretched or to the film which is being heat-dried in the extraction step, the irradiation is conducted at relatively high temperatures and consequently a high crosslinking efficiency can be obtained.

The polyethylene microporous film obtained by the above-mentioned processes may be further subjected, according to necessity, to a heat treatment at a temperature not higher than its fuse temperature in order to improve the dimensional stability of the film.

In any of the processes, it is possible to obtain a higher substantial crosslinking density (that is, gel fraction) at the same dose by heat-treating the microporous film after crosslinking.

Some preferred embodiments of the present invention are described in detail below.

The test methods shown in the Examples are as described below.

(1) Film thickness

The film thickness was determined with a dial gauge (PEACOCK NO. 25, a trade name, mfd. by Ozaki Seisakusho).

(2) Porosity

A 20 cm square sample was cut out from the microporous film and its volume and weight were determined. The porosity was calculated from the results of the determination by using the following equation.

Porosity (%)=100×(volume (cm³)−weight (g)/0.95)×volume (cm³)

(3) Average pore diameter

1. SEM Method: The average pore diameter was determined by using a scanning electron microscope.

2. Permeation Method: An aqueous 0.05% by weight of pullulan (mfd. by Showa Denko) solution was circulated under a differential pressure of 0.5 kg/cm² and the concentration of pullulan contained in the filtrate was determined by differential refractive index determination. The average pore diameter d ($\mu$m) was calculated from the molecular weight M of pullulan which showed a rejection of 50% and the intrinsic viscosity [$\eta$] of the aqueous solution by using the following equation.

$$[\eta]M = 2.1 \times 10^{21}((d/2)^2)^{3/2}$$

(4) Gel fraction

According to ASTM D2765, a sample was cut out from the microporous film, the soluble portion of the sample was extracted in boiling xylene for 12 hours to determine the change of sample weight, and the gel fraction was determined as the ratio of the residual mass of the sample after extraction to the mass of the sample before extraction from the following equation.

Gel fraction (%)=100×residual mass (g)/sample mass (g)

(5) Tensile strength and tensile modulus of elasticity

The tensile strength and tensile modulus of elasticity were determined with a TCM-500 Type tester (mfd. by MINEBEAR CO., LTD.) under conditions of a test piece width of 10 mm, separation between chucks of 50 mm and stretching speed of 200 mm/min.

(6) Piercing strength

A piercing test was conducted by using a KES-G5 Handy Compression Tester (a trade name, mfd. by KATO TECH CO., LTD.) under conditions of a radius of curvature of the needle tip of 0.5 mm and a piercing speed of 2 mm/sec, and the maximum piercing load determined was taken as the piercing strength (g). Further, the piercing strength was multiplied by 25 ($\mu$m)/film thickness ($\mu$m) to obtain a piercing strength converted to 25 $\mu$m thickness.

(7) Air permeability

The air permeability was determined with a Gurley permeability tester according to JIS P-8117. Further, the air permeability was multiplied by 25 ($\mu$m)/film thickness ($\mu$m) to obtain an air permeability converted to 25 $\mu$m thickness.

(8) Fuse temperature

An electrolytic solution was prepared by adding lithium borofluoride to a solvent mixture of propylene carbonate and butyrolactone (volume ratio=1:1) to make a concentration of 1.0 M. A polyethylene microporous film sheet cut out in a diameter of 16 mm was impregnated with the electrolytic solution and the sheet was interposed between two nickel electrodes under a pressure of 20 kg/cm². The temperature of the system was raised from room temperature at a rate of 20° C./min and the resulting change in impedance was determined under conditions of 1 V and 1 kHz. The temperature at which the impedance reached 1000 $\Omega$ in the determination was defined as the fuse temperature of the microporous film.

(9) Fuse speed

The fuse speed was calculated from the slope at an impedance of 1000 $\Omega$ according to the following equation.

$$\log(\text{fuse speed}) = \{d(\log Z)/d(t)\}_{Z=1000}$$

wherein Z represents the impedance ($\Omega$) and t (° C.) the temperature.

(10) Residual contraction rate

A microporous film sample was interposed via two pieces of fluororubber between two circular metal frames 54 mm in inner diameter, 86 mm in outer diameter and 2 mm in thickness and the circumference was fixed with clips. The film in this state was heat-treated by immersing it in a silicone oil (KF-96-10CS, a trade name, mfd. by Shin-Etsu Chemical Co., Ltd.) at 160° C. for 1 minute to remove the orientation of uncrosslinked parts. Then the sample was cut out along the inner diameter of the metal frames and immersed again in a silicone oil at 160° C. for 1 minute. The residual contraction rate of the resulting sample was calculated from the major axis a and the minor axis b of the sample according to the following equation.

Residual contraction rate (%)=ab/(54)²×100

(11) Breaking time

Two polyethylene microporous film strips each 10 mm in width were placed one upon the other, then fixed between chucks with a separation of 50 mm, and an initial load of 100 g was applied thereto. The film sample thus prepared was immersed in a silicone oil (KF-96-10CS, a trade name, mfd. by Shin-Etsu Chemical Co., Ltd.) which had been heated to 160° C. beforehand, and the time elapsed until the film broke, (that is, breaking time) was determined from the stress relaxation behavior and visual observation. When the breaking time was 10 minutes or more in this determination it was evaluated as a.

(12) Overcharge test

A lithium ion battery was prepared which comprised a positive electrode, negative electrode and electrolytic solution described below. The positive electrode was prepared using $LiCoO_2$ as the positive electrode active material, graphite and acetylene black as the current-carrying agents and fluororubber as the binder and by coating and drying on an Al foil a dimethylformamide paste which was a mixture of $LiCoO_2$, graphite, acetylene black and fluororubber in a weight ratio of 88:7.5:2.5:2. The negative electrode was prepared by coating and drying on a Cu foil a dimethylformamide paste which was a mixture of needle coke and fluororubber in a weight ratio of 95:5. The electrolytic solution was prepared by adding lithium borofluoride to a solvent mixture of propylene carbonate and butyrolactone (volume ratio=1:1) to a concentration of 1.0 M. The battery was charged at 4.2 V for 5 hours and then overcharged with a constant current. The internal temperature of the battery rose as the result of the overcharge and the current was broken when the temperature reached the fuse temperature of the sample. Samples which showed no return of electric current for at least one hour thereafter were evaluated as O. Since this test is an acceleration test, the test was conducted with a battery which had been dismantled beforehand of safety devices equipped in actual batteries, such as PTC elements.

(13) Absorbed dose

The dose determined with a film dosimeter at the irradiation spot in the electron beam irradiation apparatus was taken as the absorbed dose of the irradiated sample.

EXAMPLE 1

Forty parts of a high density polyethylene having a weight average molecular weight of $2.5 \times 10^5$ and 60 parts of a paraffin oil CP 350P, a trade name, mfd. by Matsumura Oil Research Corp.) was kneaded with a 35 mm twin-axis extruder at 200° C. to obtain a hot solution. The polymer gel was cast through a hanger coat die with a lip clearance of 1400 μm on a cooling roll adjusted to a temperature of 30° C. to obtain a sheet 1400 μm in thickness. The sheet was irradiated from the surface and the reverse face with two dosages of 20 Mrad each of electron beams (40 Mrad in total) at an acceleration voltage of 200 kV. The crosslinking-treated sheet was stretched 7×7-fold by using a batch-type simultaneous biaxial stretching machine and then the paraffin oil was removed by extraction with methylene chloride to obtain a polyethylene microporous film.

EXAMPLE 2

A polyethylene microporous film was prepared in the same manner as in Example 1 except that the absorbed dose was changed to 80 Mrad in total.

EXAMPLE 3

A polyethylene microporous film was prepared in the same manner as in Example 1 except that the acceleration voltage was changed to 500 kV and the absorbed dose to 20 Mrad in total.

EXAMPLE 4

A sheet prepared in the same manner as in Example 1 was stretched 7×7-fold by using a batch type simultaneous biaxial stretching machine, and the stretched film was irradiated from the surface and the reverse face with two dosages of 10 Mrad each of electron beams (20 Mrad in total) at an acceleration voltage of 150 kV. Thereafter, the paraffin oil was removed by extraction with methylene chloride to obtain a polyethylene microporous film.

EXAMPLE 5

A sheet prepared in the same manner as in Example 1 was stretched 7×7-fold by using a batch type simultaneous biaxial stretching machine and then the paraffin oil was removed by extraction with methylene chloride. Thereafter the stretched film was irradiated from the surface and the reverse face with two dosages of 10 Mrad each of electron beam irradiation (20 Mrad in total) at an acceleration voltage of 150 kV to obtain a polyethylene microporous film.

EXAMPLE 6

A polyethylene microporous film was prepared in the same manner as in Example 5 except that the absorbed dose was changed to 10 Mrad in total and the stretching machine was changed to a continuous simultaneous biaxial stretching machine.

EXAMPLE 7

A polyethylene microporous film was prepared in the same manner as in Example 6 except that the starting material composition was changed to 20 parts of a linear copolymer polyethylene having a melt index of 0.017 (density 0.929, propylene content 1.6% by mol), 20 parts of a high density polyethylene having a weight average molecular weight of $2.5 \times 10^5$ (density 0.956) and 60 parts of a paraffin oil (P350P, a trade name, mfd. by Matsumura Oil Research Corp.) and the absorbed dose was changed to 5 Mrad.

EXAMPLE 8

A polyethylene microporous film was prepared in the same manner as in Example 6 except that the starting material composition was changed to 6.75 parts of a linear copolymer polyethylene having a melt index of 0.017 (density 0.929, propylene content 1.6% by mol), 38.25 parts of a high density polyethylene having a weight average molecular weight of $2.5 \times 10^5$ (density 0.956) and 55 parts of a paraffin oil (P350P, mfd. by Matsumura Oil Research Corp.) and the absorbed dose was changed to 5 Mrad.

COMPARATIVE EXAMPLE 1

A polyethylene microporous film was prepared in the same manner as in Example 1 except that the electron beam irradiation was omitted.

COMPARATIVE EXAMPLE 2

A polyethylene microporous film was prepared in the same manner as in Example 1 except that the absorbed dose was changed to 4 Mrad.

COMPARATIVE EXAMPLE 3

A polyethylene microporous film was prepared in the same manner as in Comparative Example 1 except that the starting material composition was changed to 13 parts of a high density polyethylene having a weight average molecular weight of $2.5 \times 10^5$, 2 parts of a superhigh molecular weight polyethylene having a viscosity average molecular weight of $2 \times 10^6$ and 85 parts of a paraffin oil (P350P, a trade name, mfd. by Matsumura Oil Research Corp.).

COMPARATIVE EXAMPLE 4

Five and a half parts of a superhigh molecular weight polyethylene having a viscosity average molecular weight of $3 \times 10^6$, 11.5 parts of a high molecular weight polyethylene having a viscosity average molecular weight of $3 \times 10^5$, 22 parts of silica fine powder, 53 parts of dioctyl phthalate and 8 parts of liquid paraffin were mixed in a Henschel mixer and the resulting mixture was formed into a film 150 μm in thickness with a film producing apparatus comprising a 30 mm φ twin-axis extruder fitted with a T-die 450 mm in width.

The film thus formed was immersed in 1,1,1-trichloroethane for 10 minutes to extract dioctyl phthalate, then dried, further immersed in a 25% caustic soda solution at 60° C. for 60 minutes to extract silica fine powder and then dried. The microporous film thus obtained was stretched with a series of roll stretcher heated to 125° C. so as to give a film thickness of 30 μm–40 μm, and heat-treated in an atmosphere of 115° C. for 5 seconds to obtain a polyethylene microporous film which was subjected to irradiation with electron beam of 5 Mrad.

The microporous films thus prepared were examined by the test methods described above and the results are shown in Table 1.

TABLE 1

|  | Example 1 | Example 2 | Example 3 | Example 4 |
|---|---|---|---|---|
| Film thickness (μm) | 27 | 27 | 27 | 25 |
| Porosity (%) | 37 | 34 | 37 | 48 |
| Pore diameter (μm) |  |  |  |  |
| SEM method | 0.01 | 0.01 | 0.01 | 0.01 |
| Permeation method | 0.03 | 0.03 | 0.03 | 0.04 |
| Gel fraction (%) | 22 | 55 | 32 | 37 |

TABLE 1-continued

|  | | | | |
|---|---|---|---|---|
| Tensile modulus of elasticity (kg/cm$^2$) | | | | |
| MD | 7200 | 7700 | 7300 | 8520 |
| TD | 7380 | 7110 | 7570 | 8030 |
| Tensile strength (kg/cm$^2$) | | | | |
| MD | 1470 | 1510 | 1520 | 1490 |
| TD | 1350 | 1350 | 1400 | 1230 |
| Piercing strength (g/25 μm) | 630 | 630 | 630 | 520 |
| Air permeability (sec/100 cc/25 μm) | 980 | 1830 | 1100 | 670 |
| Fuse temperature (° C.) | 133 | 134 | 134 | 134 |
| Fuse speed | 55 | 50 | 42 | 35 |
| Residual contraction rate (%) | 21 | 17 | 22 | 27 |
| Breaking time (sec) | ∞ | ∞ | ∞ | ∞ |
| Overcharge test | | | | |
| 3A | ◯ | ◯ | ◯ | ◯ |
| 4A | ◯ | ◯ | ◯ | ◯ |
| Absorbed dose (Mrad) | 40 | 80 | 20 | 20 |
| Remarks | After film-forming | After film-forming | After film-forming | After stretching |

|  | Example 5 | Example 6 | Example 7 | Example 8 |
|---|---|---|---|---|
| Film thickness (μm) | 25 | 29 | 24 | 25 |
| Porosity (%) | 41 | 49 | 37 | 41 |
| Pore diameter (μm) | | | | |
| SEM method | 0.01 | 0.01 | 0.01 | 0.01 |
| Permeation method | 0.05 | 0.05 | 0.04 | 0.05 |
| Gel fraction (%) | 75 | 68 | 59 | 57 |
| Tensile modulus of elasticity (kg/cm$^2$) | | | | |
| MD | 9100 | 16900 | 16200 | 20700 |
| TD | 8730 | 5600 | 5500 | 7580 |
| Tensile strength (kg/cm$^2$) | | | | |
| MD | 1520 | 1030 | 1220 | 1480 |
| TD | 1310 | 610 | 570 | 890 |
| Piercing strength (g/25 μm) | 540 | 440 | 460 | 640 |
| Air permeability (sec/100 cc/25 μm) | 660 | 430 | 860 | 580 |
| Fuse temperature (° C.) | 135 | 136 | 130 | 134 |
| Fuse speed | 32 | 79 | 30 | 66 |
| Residual contraction rate (%) | 35 | 28 | 34 | 26 |
| Breaking time (sec) | ∞ | ∞ | ∞ | ∞ |
| Overcharge test | | | | |
| 3A | ◯ | ◯ | ◯ | ◯ |
| 4A | ◯ | ◯ | ◯ | ◯ |
| Absorbed dose (Mrad) | 20 | 10 | 5 | 5 |
| Remarks | After extraction | After extraction | After extraction | After extraction |

|  | Comparative Example 1 | Comparative Example 2 | Comparative Example 3 | Comparative Example 4 |
|---|---|---|---|---|
| Film thickness (μm) | 27 | 25 | 25 | 34 |
| Porosity (%) | 42 | 42 | 39 | 63 |
| Pore diameter (μm) | | | | |
| SEM method | 0.01 | 0.01 | 0.01 | 0.3 |
| Permeation method | 0.03 | 0.03 | 0.03 | 0.24 |
| Gel fraction (%) | 0 | 0 | 0 | 55 |
| Tensile modulus of elasticity (kg/cm$^2$) | | | | |
| MD | 9700 | 9440 | 12700 | 7500 |
| TD | 9180 | 9050 | 11900 | 690 |
| Tensile strength (kg/cm$^2$) | | | | |
| MD | 1700 | 1720 | 2410 | 530 |
| TD | 1370 | 1310 | 1920 | 80 |
| Piercing strength (g/25 μm) | 640 | 620 | 850 | 200 |
| Air permeability (sec/100 cc/25 μm) | 680 | 680 | 610 | 130 |
| Fuse temperature (° C.) | 137 | 137 | 143 | 137 |
| Fuse speed | 89 | 75 | 28 | 4 |
| Residual contraction rate (%) | — | — | — | 31 |
| Breaking time (sec) | 1 | 1 | 3 | ∞ |
| Overcharge test | | | | |
| 3A | Break | Break | Break | ◯ |
| 4A | Break | Break | Break | Break |
| Absorbed dose (Mrad) | 0 | 4 | 0 | 5 |
| Remarks | No irradiation | After film-forming | No irradiation | Large pore diameter |

The polyethylene microporous film according to the present invention has both a sharp fuse effect and a high heat resistance. Therefore, the use of the film particularly as a separator for a battery improves the stability of the film under the fuse conditions and prevents the return of electric current due to film breakage from occurring and as a result can enhance the stability of the battery.

What is claimed is:

1. A polyethylene microporous film having high strength and excellent heat resistance which has a crosslinked structure and has a porosity of 20–80%, a gel fraction of 1% or more and an average pore diameter determined by the permeation method of 0.001–0.1 μm.

2. The polyethylene microporous film according to claim 1 which has a residual contraction rate of 15% or more.

3. The polyethylene microporous film according to claim 1 or 2 which has a fuse speed of 5.0 or more.

4. The polyethylene microporous film according to claim 1 which has a piercing strength of 300 g or more.

5. The polyethylene microporous film according to claim 1 which has a piercing strength of 400 g or more.

6. The polyethylene microporous film according to claim 1 which has a breaking time in silicone oil at 160° C. of 20 seconds or more.

7. A process for producing a polyethylene microporous film comprising the steps of preparing a hot solution consisting essentially of polyethylene and a plasticizer, cooling and solidifying the hot solution to form a sheet, stretching the sheet in at least a uniaxial direction to obtain an oriented film, and removing by extraction the plasticizer contained in the oriented film wherein at least one crosslinking treatment is applied to the sheet or film during any one of the process steps or after the process steps.

8. The process for producing a polyethylene microporous film according to claim 7 wherein the crosslinking treatment is applied after the stretching.

9. The process for producing a polyethylene microporous film according to claim 7 or 8 wherein the crosslinking treatment is electron beam irradiation.

10. The process for producing a polyethylene microporous film according to claim 7 wherein electron beam irradiation is conducted after removing the plasticizer by extraction.

11. A separator for batteries made from the polyethylene microporous film according to claim 1.

12. A battery containing the separator of claim 11.

13. A separator according to claim 11, wherein said batteries are lithium ion batteries.

14. A lithium ion battery containing the separator of claim 13.

15. The process for producing a polyethylene microporous film according to claim 7, wherein the plasticizer is selected from the group consisting of decalin, xylene, dioctyl phthalate, dibutyl phthalate, stearyl alcohol, oleyl alcohol, decyl alcohol, nonyl alcohol, diphenyl ether, n-decane, n-dodecane and paraffin oil.

16. The process for producing a polyethylene microporous film according to claim 7, wherein the plasticizer concentration is in the range of from 20 to 90 wt. %, based upon the total mass of plasticizer plus polyethylene.

17. The polyethylene microporous film of claim 1, wherein the film has an air permeability, converted to a thickness of 25 $\mu$m, of not more than 2,000 seconds.

* * * * *